US006419456B1

(12) United States Patent
Cooper et al.

(10) Patent No.: US 6,419,456 B1
(45) Date of Patent: Jul. 16, 2002

(54) SWITCH FOR CONTROLLING THE MOTOR OF A PISTON PUMP

(75) Inventors: Robert D. Cooper, Elk River; Thomas L. Kruzel, Maple Grove, both of MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 34 days.

(21) Appl. No.: 09/602,199

(22) Filed: Jun. 22, 2000

Related U.S. Application Data

(60) Provisional application No. 60/161,144, filed on Oct. 22, 1999.

(51) Int. Cl.[7] .......................... F04B 19/24; F04B 49/06; H01H 35/38; G01L 9/00

(52) U.S. Cl. ........................ 417/44.2; 417/53; 417/307; 417/308; 200/82 A; 200/82 C; 73/745

(58) Field of Search ......................... 417/44.2, 53, 307, 417/308; 200/82 A, 82 C; 73/745

(56) References Cited

U.S. PATENT DOCUMENTS

| | | | | | |
|---|---|---|---|---|---|
| 3,614,352 | A | | 10/1971 | Wiese | |
| 4,009,971 | A | | 3/1977 | Krohn | 417/44.2 |
| 4,620,669 | A | | 11/1986 | Polk | |
| 4,755,638 | A | * | 7/1988 | Geberth, Jr. | 73/745 |
| 4,992,633 | A | | 2/1991 | Cyphers | |
| 5,059,099 | A | | 10/1991 | Cyphers | |
| 5,067,654 | A | * | 11/1991 | Paige | 417/307 |
| 5,074,467 | A | * | 12/1991 | Geberth | 200/82 C |
| 5,084,964 | A | | 2/1992 | Cyphers | |
| 5,201,023 | A | | 4/1993 | Motzko | |
| 5,228,842 | A | | 7/1993 | Guebeli | |
| 5,282,722 | A | * | 2/1994 | Beatty | 417/44.2 |
| 5,292,232 | A | * | 3/1994 | Krohn et al. | 417/44.2 |
| 5,316,445 | A | | 5/1994 | Snetting | |
| 5,346,037 | A | | 9/1994 | Flaig | |
| 5,435,697 | A | | 7/1995 | Guebeli | |
| 5,472,318 | A | | 12/1995 | Frank | |
| 5,671,656 | A | | 9/1997 | Cyphers | |
| 5,725,364 | A | | 3/1998 | Mirazita | 417/44.2 |
| 5,769,321 | A | | 6/1998 | Cyphers | |
| 5,848,566 | A | | 12/1998 | Walsh | |
| 5,934,883 | A | | 8/1999 | Osterloff | |
| 6,031,352 | A | | 2/2000 | Carlson | |
| 6,074,170 | A | * | 6/2000 | Bert et al. | 417/44.2 |

FOREIGN PATENT DOCUMENTS

| | | |
|---|---|---|
| EP | 0756902 | 2/1997 |

* cited by examiner

*Primary Examiner*—Charles G. Freay
*Assistant Examiner*—Timothy P. Solak
(74) *Attorney, Agent, or Firm*—Patterson, Thuente, Skaar & Christensen, P.A.

(57) ABSTRACT

A fluid pump having a motor operably coupled to a pump assembly, the motor and pump assembly acting cooperatively to pressurize a fluid includes a pressure switch being in communication with the fluid under pressure and being in communication with the motor for sensing the fluid pressure and controlling the operation of the motor to maintain a selected fluid pressure. A method of controlling fluid pressure in a fluid pump, the fluid pressure being generated by activating a pump motor to operate a pump assembly.

32 Claims, 5 Drawing Sheets

SWITCH FOR CONTROLLING THE MOTOR OF A PISTON PUMP

RELATED APPLICATIONS

The present application claims the benefit of U.S. Provisional Patent Application No. 60/161,144, filed Oct. 22, 1999, incorporated herein by reference in its entirety.

TECHNICAL FIELD

The present invention relates to a pump. More particularly, the present invention relates to a liquid pump useful for pumping liquid paints, stains, and the like.

BACKGROUND OF THE INVENTION

There is a need for inexpensive yet reliable and effective pumps for pumping fluids, including paint, stains, and the like to a dispenser of such fluids. Such pumps are primarily intended for use in a household environment, as distinct from a commercial environment. Accordingly, the emphasis is on cost containment, while having the requisite durability for the environment of the intended use. The pumps should be readily throttleable for use with very high flow rates and high pressures and for use with relatively low flow rates and low pressures. An example of high flow rates and high pressures would be the use of a spray gun dispenser with relatively viscous paint. Dispensing a relatively low viscosity stain through a spray gun typically requires significantly lower pressures, but the flow rate is high. A further type of dispensation is by means of a roller that is supplied with paint from the pump. Such means of dispensation require a relatively low fluid volume at relatively low fluid pressure for delivery of the viscous paint. There is a need in the industry for a pump that is throttleable to accommodate all the exemplary types of dispensation listed above and other types of dispensation as well.

There is a further need in the industry to enhance the reparability of such pumps. A potential problem area with such pumps is the pump assembly. If there is difficulty with the pump assembly, it is desirable that the pump assembly be readily removable from the housing in which it is disposed for repair or replacement. In existing pumps, the pump assembly is not readily removable.

There is a further need to simplify as much as possible the construction of the pump. A reduction in the number of component parts is one path to such simplification. One area in which such simplification is desirable is in the area of the pressure switch assembly. In the past, such assemblies were complex and required rather lengthy plumbing between the pump assembly and the position on the side of the motor housing where the pressure switch assembly was mounted. Another area of needed simplification is that, in the existing pumps, the main gear housing and the pump assembly housing are formed as two separate components. A desired simplification of the structure of the pump would be to combine the main gear housing and the pump housing into a single component. A further area of needed simplification is in the number of cast components as distinct from more costly screw machined parts.

SUMMARY OF THE INVENTION

The present invention substantially meets the aforementioned needs of the industry. Simplification of the piston pump of the present invention is evident in a single main housing that incorporates a housing for both the pump assembly and the pump drive assembly. Additionally, the pump housing is machinable from a single direction to simplify production. A further benefit of this is that it allows the pump assembly installed in the pump housing to be fully serviceable from that same direction.

Additionally, the pressure switch assembly of the present invention is greatly simplified in construction with respect to the pressure switch assemblies of the prior art. And, the pressure switch assembly of the present invention allows for greatly varying the flow rate and flow pressure of the liquid pumped by the piston pump of the present invention, unlike pressure switch assemblies of the prior art. The pressure switch assembly advantageously has a certain compliance built in to accommodate an over pressure condition without damage to any pressure switch assembly components.

Another area of simplicity in the design of the piston pump of the present invention is in the design of the pump assembly. The pump assembly is elongate in design and is readily extractable from the pump housing bore for repair as necessary. Further, a number of key components are now cast, where previous components performing the same function were screw machined, a significantly more costly operation.

The present invention is a fluid pump having a motor operably coupled to a pump assembly, the motor and pump assembly acting cooperatively to pressurize a fluid includes a pressure switch being in communication with the fluid under pressure and being in communication with the motor for sensing the fluid pressure and controlling the operation of the motor to maintain a selected fluid pressure. The present invention is further a method of controlling fluid pressure in a fluid pump, the fluid pressure being generated by activating a pump motor to operate a pump assembly, including the steps of:

- selecting a desired fluid pressure by manual actuation of a set screw assembly;
- positioning a micro switch relative to a pressure sensor assembly by means of such selection;
- engaging the micro switch by means of a pressure sensor assembly at the selected fluid pressure;
- sending a signal to the pump motor by means of the micro switch upon engagement by the pressure sensor assembly; and
- deactivating the pump motor responsive to the signal sent from the micro switch.

DETAILED DESCRIPTION OF THE DRAWINGS

Figure 2:
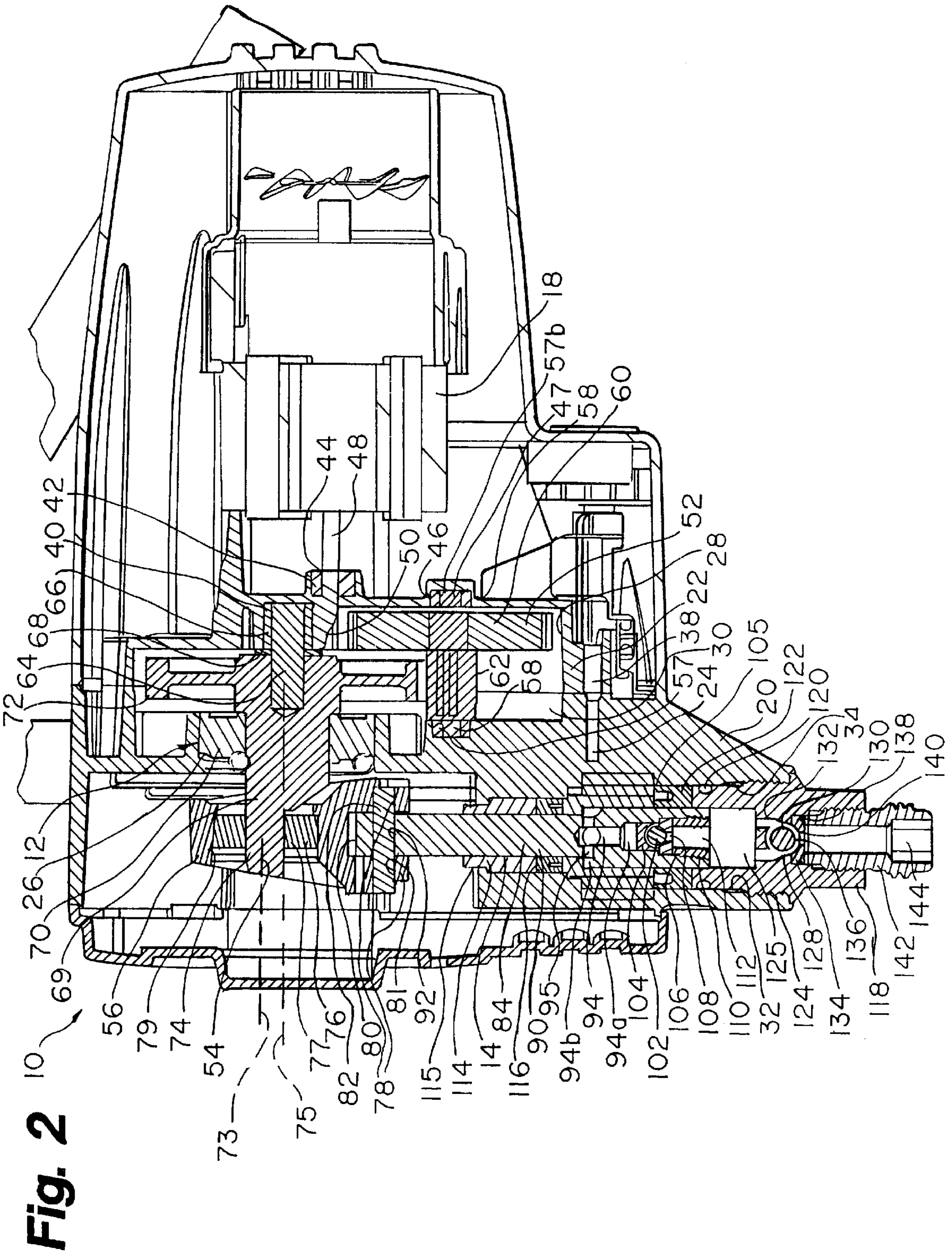
FIG. 2 is a left side sectional view of the piston pump.

The piston pump of the present invention is shown generally at 10 in the figures. Referring to FIG. 2, the piston pump 10 has four major components: pump drive assembly 12, pump assembly 14, pressure switch assembly 16, and electric motor 18.

The pump drive assembly 12 of the piston pump 10 has two major subcomponents: main housing 20 and gear housing 22.

The main housing 20 is preferably a single casting that functions to house, in part, the gear train of the piston pump 10 and also functions as the pump housing of the piston pump 10. The main housing 20 has a plurality of threaded bores 24 defined therein. The main housing 20 further includes an eccentric gear bearing housing 26 and a spaced apart reduction gear bearing housing 28. The main housing 20 defines an interior cavity in cooperation with the gear housing 22, the interior cavity functioning as the gear box 30.

Figure 4:
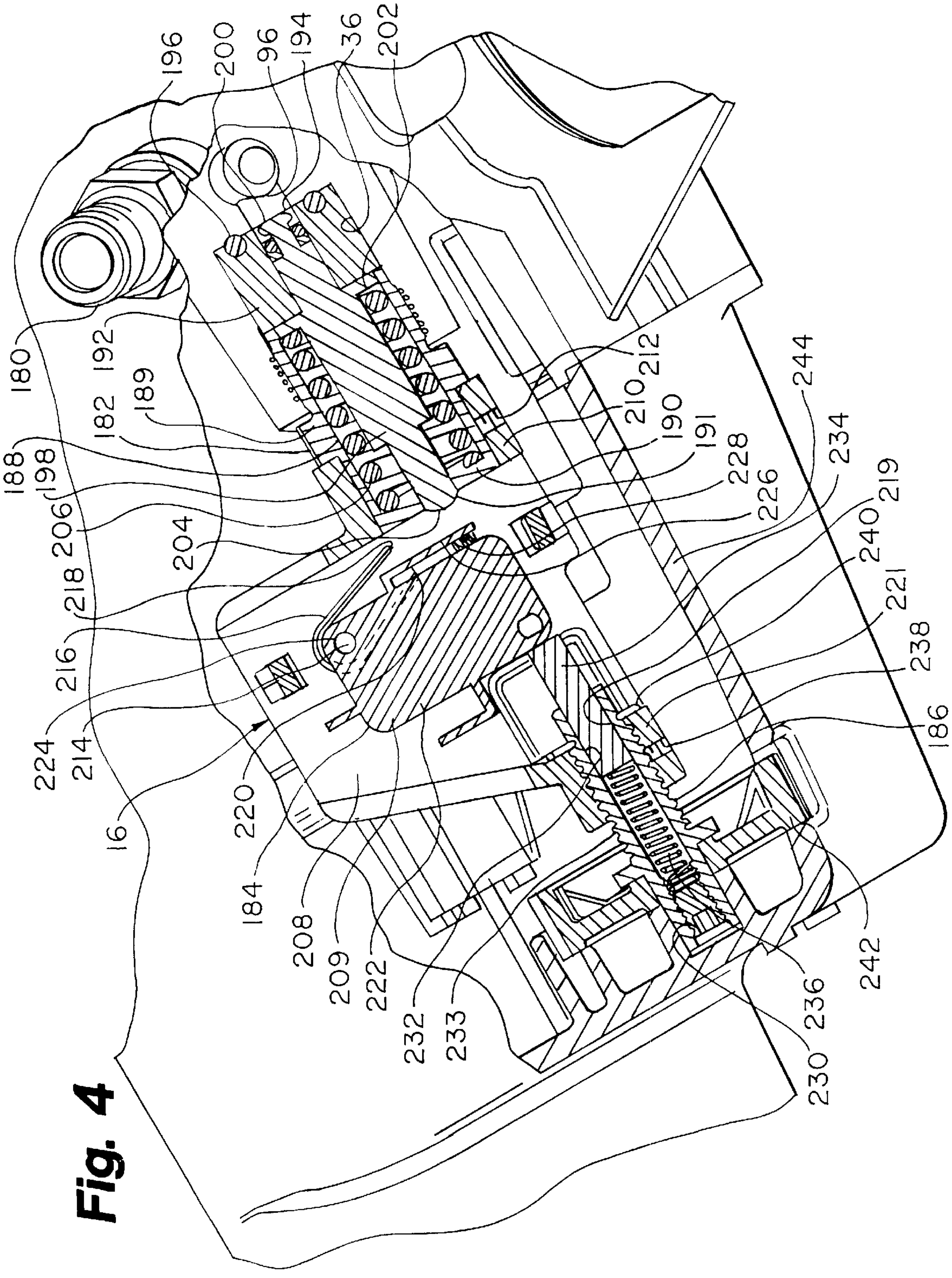
FIG. 4 is a sectional perspective view of the pressure switch of the piston pump.

The main housing 20 further includes the pump housing 32. The pump housing 32 is comprised of a pump housing bore 34. Referring to FIG. 4, the main housing 20 additionally includes a pressure switch bore 36 defined therein.

The gear housing 22 has a plurality of screw bores 38, as depicted in FIG. 2. When the main housing 20 and gear housing 22 are assembled, the threaded bores 24 of the main housing 20 and the screw bores 38 of the gear housing 22 are in registry. Suitable threaded fasteners (not shown) may be inserted through the screw bores 38 and threaded into the threaded bores 24 to secure the main housing 20 to the gear housing 22. The gear housing 22 includes an eccentric gear bearing housing 40 and a shaft bearing housing 42. A shaft bore 44 is formed coaxial with the shaft bearing housing 42. A reduction gear bearing housing 46 is also defined in the gear housing 22.

The electric motor 18 of the piston pump 10 has an output shaft 48 that is supported in a bearing 47 disposed in the shaft bearing housing 42. The output shaft 48 terminates in a spline 50 that projects through the shaft bore 44 defined in the gear housing 22.

The pump drive assembly 12 of the piston pump 10 includes three major subcomponents: reduction gear 52, drive gear assembly 54, and yoke assembly 56.

The reduction gear 52 has opposed ends 57*a*, 57*b*. The ends 57*a*, 57*b* are respectively rotatably borne in an end bearing 58 disposed in the reduction gear bearing housing 46 and in an end bearing 58 disposed in the reduction gear bearing housing 28 of the main housing 20. The reduction gear 52 has a first gear 60 and a second gear 62. The first gear 60 has a substantially greater diameter than the second gear 62 and has a significantly greater number of teeth. Accordingly, while the rotational speed of the first gear 60 and the second gear 62 are the same, the speed taken tangential to the second gear 62 is substantially reduced with respect to the speed taken tangential to the first gear 60. The first gear 60 is rotationally engaged with the spline 50 of the electric motor 18. The second gear 62 is rotationally engaged with the drive gear assembly 54.

The drive gear assembly 54 has a first end shaft 64 that is rotationally borne by a needle bearing 66 disposed in the eccentric bearing housing 40 defined in the gear housing 22. A thrust bearing 68 is disposed concentric with the first end shaft 64 between a face of the drive gear assembly 54 and a face of the gear housing 22. The second end shaft 69 of the drive gear assembly 54 is rotationally borne in a bearing 70 disposed within the eccentric gear bearing housing 26 defined in the main housing 20. The relatively large gear 72 of the drive gear assembly 54 is meshed with the relatively small second gear 62 of the reduction gear 52. The reduction gear 52 and the drive gear assembly 54 cooperate to reduce the output of the electric motor 18 at a preferred ratio of approximately 34:1. Accordingly, the electric motor 18 operating at approximately 12,000 rpm is reduced to approximately 260 rpm at the drive gear assembly 54 and 260 strokes per minute at the pump assembly 14. The output of the drive gear assembly 54 is eccentric output shaft 74. The center line 73 of the eccentric output shaft 74 is offset from the center of rotation 75 of the drive gear assembly 54, such that rotation imparted to the drive gear assembly 54 via the gear 72 produces an orbital rotation of the eccentric output shaft 74. Accordingly, the eccentric output shaft 74 has both rotational motion and orbital motion (see also FIG. 3).

The orbital motion of the eccentric output shaft 74 is imparted to the yoke assembly 56. The rotational motion of the eccentric output shaft 74 is not imparted to the yoke assembly 56 since the eccentric output shaft 74 rotates with respect to the yoke assembly 56.

Figure 3:
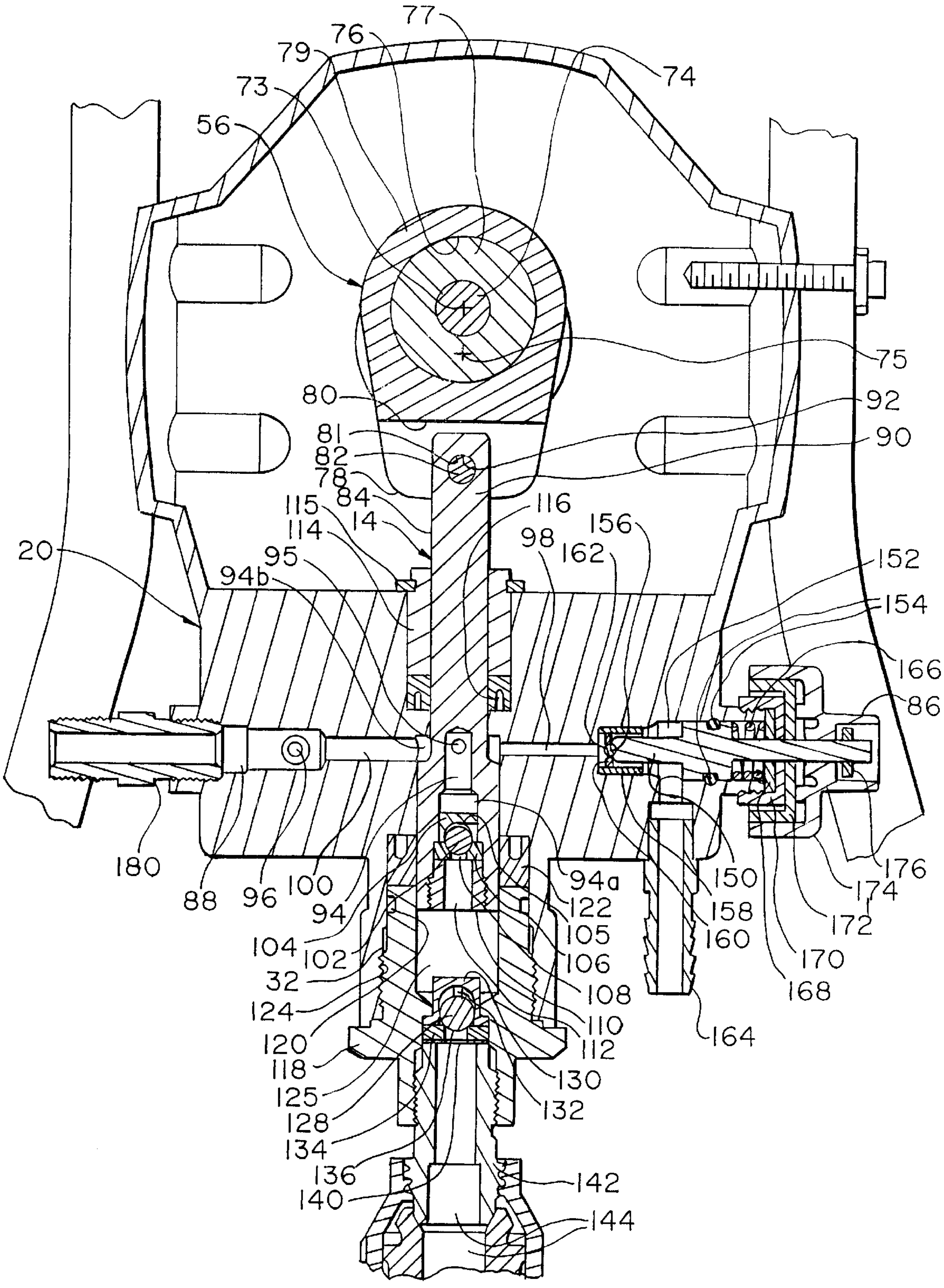
FIG. 3 is a front sectional view of the pump assembly of the piston pump.

As depicted in FIGS. 2 and 3, the yoke assembly 56 has a yoke 79 with a bearing housing 76 defined therein. A bearing 77 is disposed within the bearing housing 76. The bearing 77 rotationally supports the eccentric output shaft 74. During operation, the eccentric output shaft 74 rotates with respect to the bearing 77. The bearing 77 is fixed within the bearing housing 76.

A pair of spaced apart yoke arms 78 depend from the yoke assembly 56. The yoke arms 78 define a yoke aperture 80 between the two yoke arms 78. A pair of opposed pin bores 81 are defined in the yoke arms 78. The outside pin bore 81 carries fully through the yoke arm 78. A dowel pin 82 is disposed in the pin bores 81. The dowel pin 82 operably couples the piston assembly 84 to the yoke assembly 56. In a preferred embodiment, the yoke of the yoke assembly 56 is formed of a zinc alloy casting. Preferably, the lubricity of the zinc alloy is sufficient to carry the steel dowel pin directly without the need for dowel pin bushings. Such lubricity is sufficient to provide for negligible wear at the rotational intersection of the dowel pin 82 with the pin bores 81.

The second component of the piston pump 10 is the pump assembly 14, depicted in FIGS. 2 and 3. It is significant to note that the pump assembly 14 is disposed in the pump housing 32 formed integrally with the main housing 20. In a preferred embodiment, the main housing 20 is cast of aluminum containing material. Accordingly, the pump housing bore 34 of the main housing 20 is also formed of aluminum. In the past, the pump housing of a prior art pump has always been made separate from the main housing 20. Typically, the pump housing has been made of steel that has been screw machined and is then affixed in the main housing, typically by a threaded engagement or being pressed in. By forming the pump housing 32 integral with the main housing 20 considerable cost savings are achieved. Further, casting the entire main housing 20, including the pump housing 32, out of aluminum has resulted in further cost savings for the piston pump 10 of the present invention.

The pump assembly 14 of the piston pump 10 has three primary subcomponents: piston assembly 84 (see FIGS. 2 and 3), prime assembly 86 (see FIG. 3), and outlet 88 (see FIG. 3).

The piston assembly 84 is an elongate rod preferably made of steel. In a preferred embodiment, the steel piston 90 is slidably, translatably disposed within the aluminum pump housing bore 34 of the pump housing 32. In order to prevent galling of the pump housing bore 34, there is a small circumferential space defined between the exterior surface of the piston 90 and the interior surface of the pump housing bore 34. This slight space makes it possible to translate the steel piston 90 within the aluminum pump housing bore 34 without inducing appreciable wear of the pump housing bore 34.

A transverse pin bore 92 is defined in the piston 90 proximate the upper margin of the piston 90. The dowel pin 82 is disposed in the pin bore 92 in order to couple the piston 90 of the yoke assembly 56. As the yoke assembly 56 rotates through its orbital motion, the piston 90 rocks back and forth about the dowel pin 82 in order to maintain the desired concentric alignment of the piston 90 with respect to the pump housing bore 34.

An upper fluid chamber 94 is defined in part internal to the piston 90 and in part external to the piston 90. Accordingly, the fluid chamber 94 is defined by the volume of the fluid chamber 94*a* plus the volume of the fluid chamber 94*b*. The fluid chamber 94*a* is defined by a longitudinal bore defined within the lower portion of the piston 90. The fluid chamber 94*b* is defined between the exterior surface of the piston 90 and the interior surface of the pump housing bore 34. The fluid chambers 94*a*, 94*b* are fluidly coupled by a fluid passage 95 defined in the piston 90 transverse to the longitudinal axis of the fluid chamber 94*a*.

Referring to FIG. 3, a prime passage 98 is fluidly coupled to the fluid chamber 94. An outlet passage 100 is also fluidly connected to the fluid chamber 94. In a preferred embodiment, a pressure switch passage 96 intersects the outlet passage 100. As will be seen, the pressure switch passage 96 could intersect either the prime passage 98 or the outlet passage 100 and still provide an adequate pressure reading to the pressure switch assembly 16, discussed in detail below.

An upper ball 102 (see FIGS. 2 and 3) or outlet valve defines the lower margin of the volume of the fluid chamber 94. The upper ball 102 is retained within an upper ball cage 104. The upper ball cage 104 has a plurality of cage bores 105 defined therein such that, when the upper ball 102 is pressed upward against the upper ball cage 104, fluid is free to pass around the upper ball 102 and through the cage bores 105 into the fluid chamber 94. An upper seat 106 is disposed beneath the upper ball 102. The upper seat 106 is generally ring shaped having a bore 108 defined centrally thereto. The upper seat 106 is retained in position in engagement with the upper ball cage 104 by a retainer 110. The retainer 110 is preferably threaded into the piston 90. Retainer 110 has a centrally defined axial retainer bore 112.

The piston 90 is translatably disposed within an upper seal bushing 114. The upper seal bushing 114 is retained within the pump housing bore 34 by a retaining clip 115. A circumferential upper seal 116 is disposed at the lower margin of the upper seal bushing 114.

A cylinder fitting 118 is disposed in the lower portion of the pump housing bore 34 for supporting the piston 90 in the manner of a bushing. An O-ring 120 is preferably disposed in a groove defined in a cylinder fitting 118 proximate the upper margin of the cylinder fitting 118. The cylinder fitting 118 further holds a lower seal 122 in sealing engagement with the piston 90. The cylinder fitting 118 is held in threaded engagement with the pump housing bore 34 by threads 124.

A lower fluid chamber 125 is defined within the cylinder fitting 118. The pump assembly 14 is a double acting pump. The volume of the fluid chamber 94 is approximately one-half the volume of the lower fluid chamber 125. Fluid is discharged from the fluid chamber 94 on both the downstroke of the piston 90 and on the upstroke of the piston 90. The lower fluid chamber 125 is filled only on the upstroke of the piston 90. Accordingly, there is no discernable lapse in fluid discharge from the pump assembly 14, even though the chamber 125 is filled only on the upstroke of the piston 90.

The lower margin of the lower fluid chamber 125 is defined by the lower ball 128 or the inlet valve. The lower ball 128 is retained within a lower ball cage 130. A plurality of ball cage bores 132 are defined in the lower ball cage 130, such that when the lower ball 128 is pressed upward against the lower ball cage 130, fluid is free to pass upward around the lower ball 128 through the ball cage bores 132 into the lower fluid chamber 125. A seat 134 is disposed beneath the ball cage 130. The seat 134 is generally ring shaped having a centrally defined bore 136. In a preferred embodiment, the lower ball cage 130 may be cast integrally, unitary with the cylinder fitting 118 to eliminate the need for retaining components necessary for a ball cage that is formed separate from the cylinder fitting 118. This design contributes to the simplification of the piston pump 10. An inlet fitting 142 having a centrally defined inlet passage 144 may be threaded into the cylinder fitting 118.

In a preferred embodiment, both the upper seal bushing 114 and the cylinder fitting 118 are formed of a zinc alloy. By making the upper sealing bushing 114 and the cylinder fitting 118 of the zinc alloy, the two components can be cast. This is a significant departure from prior practice in which components performing the function of the upper seal bushing 114 and the cylinder fitting 118 were made of screw machined bronze. As compared to a cast zinc fitting, screw machined fittings are significantly more expensive.

A further advantage of the design of the piston pump 10 of the present invention is that the entire fluid section comprising the pump assembly 14 is what may be termed a "bottom up" design. By this is meant that the pump housing bore 34, by having ever decreasing bore diameters from the bottom to the top as depicted in FIGS. 2 and 3, may be machined in its entirety from the bottom up. Further, servicing of the pump assembly 14 is greatly enhanced by this design. Merely withdrawing the dowel pin 82 and removing the retaining clip 115 allows the entire pump assembly 14 to be withdrawn from the bottom of the piston pump 10 for servicing of the pump assembly 14. The same feature that provides for the enhanced servicing of the pump assembly 14 also provides for ease of assembly of the pump assembly 14 into the main housing 20. A fully assembled pump assembly 14 may be simply inserted from the bottom upward into the pump housing bore 34 and then coupled to the yoke assembly 56 by means of the dowel pin 82 and secured within the pump housing bore 34 by means of the retaining clip 115. In the past, some assembly of the components performing the function of the pump assembly 14 was done from above and some done from below, greatly increasing the complexity of assembly and maintenance of the piston pump 10.

The second component of the pump assembly 14 of the piston pump 10 is the prime assembly 86. The prime assembly 86 is best depicted in FIG. 3. The prime assembly 86 includes a ball/stem assembly 150. The ball/stem assembly 150 is translatably disposed within a prime bore 152 defined in the main housing 20. In a preferred embodiment, the prime bore 152 is oriented transverse to and offset from the longitudinal axis of the pump housing bore 34. An O-ring 154 resides in a groove defined in the exterior surface of the ball/stem assembly 150 to create a substantially fluid tight seal between the ball/stem assembly 150 and the prime bore 152.

Figure 1:
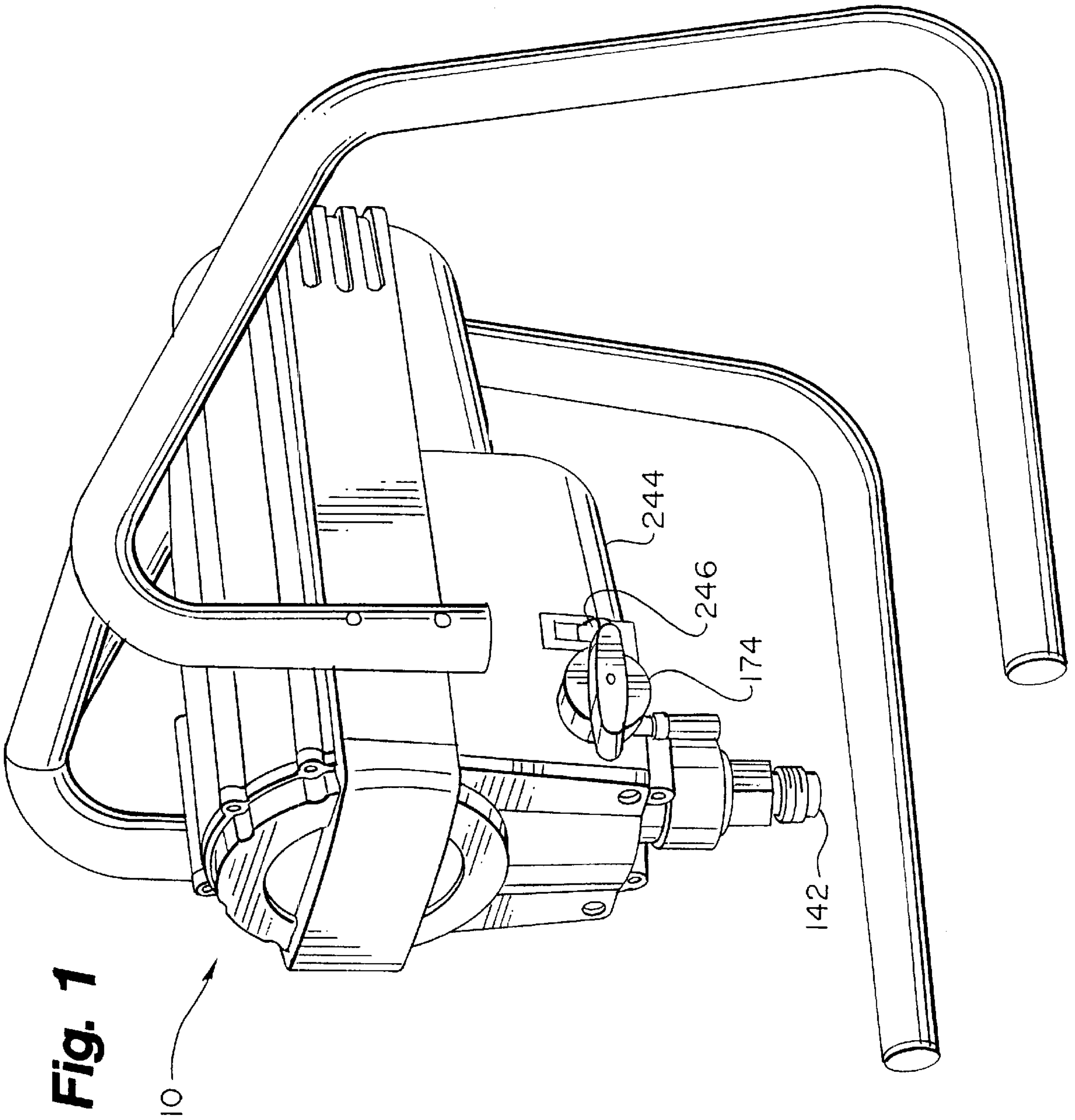
FIG. 1 is a perspective left side view of the piston pump of the present invention.

A ball 156 is disposed at a proximal end of the ball/stem assembly 150. The ball 156 engages a seat 160. The seat 160 is generally ring shaped having a central passage 162 defined therein. The central passage 162 is in fluid communication with the prime passage 98. A spring 166 is disposed concentric with the ball/stem assembly 150. The spring 166 acts to bias the ball/stem assembly 150 in a leftward direction as depicted in FIG. 3. Such bias acts to seat the ball 156 on the seat assembly 158. The spring 166 bears on a shoulder of the ball/stem assembly 150 and a lock washer 168. A nut 170 holds the lock washer 168 in place. A cam 172 is interposed between the nut 170 and the knob 174. Finally, a nut 176 on the distal end of the ball/stem assembly 150 holds the knob 174 in place. The knob 174 is manually rotatable between a "spray" position and a "prime" position. See FIG. 1.

The final component of the pump assembly is the outlet 88, as depicted in FIG. 3. The outlet 88 includes a spray hose fitting 180. The spray hose fitting 180 is meant to interface between a hose coupled to a dispenser, such as a spray gun, and the piston pump 10 of the present invention. The spray hose fitting 180 is fluidly coupled to the outlet 88.

The pressure switch assembly 16 of the piston pump 10 of the present invention has three major subcomponents: pressure sensor assembly 182, micro switch assembly 184, and set screw assembly 186.

The pressure sensor assembly 182 is in fluid communication with the pressure switch passage 96 (depicted in FIGS. 3 and 4) and thereby is in fluid communication with the fluid chamber 94. Referring to FIG. 4 for the rest of this description, the pressure sensor assembly 182 is disposed in the pressure switch bore 32 defined in the main housing 20. A spring retainer housing 189 is threadedly engaged in the bore 188. The spring retainer housing 189 has an end wall 190. The end wall 190 has a plunger aperture 191 centrally defined therein. The spring retainer housing 189 bears on a bushing 192. The bushing 192 has a bushing bore 194 defined therein. Bushing 192 is a circular groove defined in an end margin thereof with an O-ring 196 disposed in the groove to define a substantially fluid tight seal between the pressure sensor assembly 182 and the main housing 20. A plunger 198 is translatably disposed along a longitudinal axis of the spring retainer housing 189. The proximal end 200 of the plunger 198 is carried within the bore 194 defined in the bushing 192. In such disposition, the proximal end 200 is exposed to the fluid pressure in the pressure switch passage 96.

The plunger 198 has a shoulder 202 that abuts a second end margin bushing 192 when no pressure is being sensed by the pressure sensor assembly 182. The distal end 204 of the plunger 198 projects through the plunger aperture 194 defined in the end wall 190.

A spring 206 is disposed within the spring retainer housing 189 concentric with the plunger 198. A first end of the spring 206 bears on the end wall 190 and a second end of the spring 206 bears on the shoulder 202. The bias of the spring 206 acts to urge the plunger 198 in a rightward (closed) direction, as depicted in FIG. 4.

The micro switch assembly 184 includes a substantially planar switch body 208 having a generally circular connector 210. The connector 210 is disposed circumferential to a portion of the spring retainer housing 189 and is fixedly coupled thereto by a set screw 212.

A pivot arm 214 projects outwardly from the switch body 208 (toward the viewer of FIG. 4). The micro switch 209 is rotatably disposed on the pivot arm 214. The pivot arm 214 has a small coil spring 216 disposed thereon. The spring 216 has a first end 218 engaged in a groove defined in the switch body 208. A second end 220 of the spring 216 engages an edge margin of the housing 222 of the micro switch 209.

A generally cylindrical actuator connector 221 is formed integral with the switch body 208 generally opposite to the connector 210. The actuator connector 221 has a threaded bore 219 defined therethrough.

As indicated above, the micro switch 209 has a switch housing 222. The switch housing 222 has a pivot bore 224 defined therethrough. The micro switch 209 is pivotally borne on the pivot arm 214 by the pivot bore 224. The bias exerted by the spring 216 tends to rotate the micro switch 184 in a clockwise direction about the pivot arm 214.

The switch housing 222 has a deflectable metallic paddle 226 disposed on a side margin of the switch housing 222 facing the plunger 198. The distal end of the paddle 226 rests on a small switch 228 projecting from the side margin of the switch housing 222. The micro switch 209 is connected by suitable wire connectors (not shown) to the motor 18.

The set screw assembly 186 of the pressure switch assembly 16 includes a spindle body 230. The spindle body 230 has a longitudinal bore 232 defined therein. The spindle body 230 further includes a threaded exterior margin 233 that is threaded into the threaded bore 219 of the actuator connector 221. A dowel pin 234 and a spring 236 are disposed in tandem within the longitudinal bore 232. The spring 236 acts on a first end of the dowel pin 234 urging a second end of the dowel pin 234 into engagement with the switch housing 222 of the micro switch 184. The bias of the spring 236 acts to urge the switch housing 222 to pivot in a counterclockwise direction about the pivot arm 214. Accordingly, the spring 206 and the spring 236 act opposing one another. A set screw 238 is threadedly engaged with an end of the longitudinal bore 232 to retain the spring 236 within the longitudinal bore 232. An e-clip 240 disposed in a circumferential groove on the dowel pin 234 acts to limit the leftward travel of the dowel pin 234 in the longitudinal bore 232.

Figure 1A:
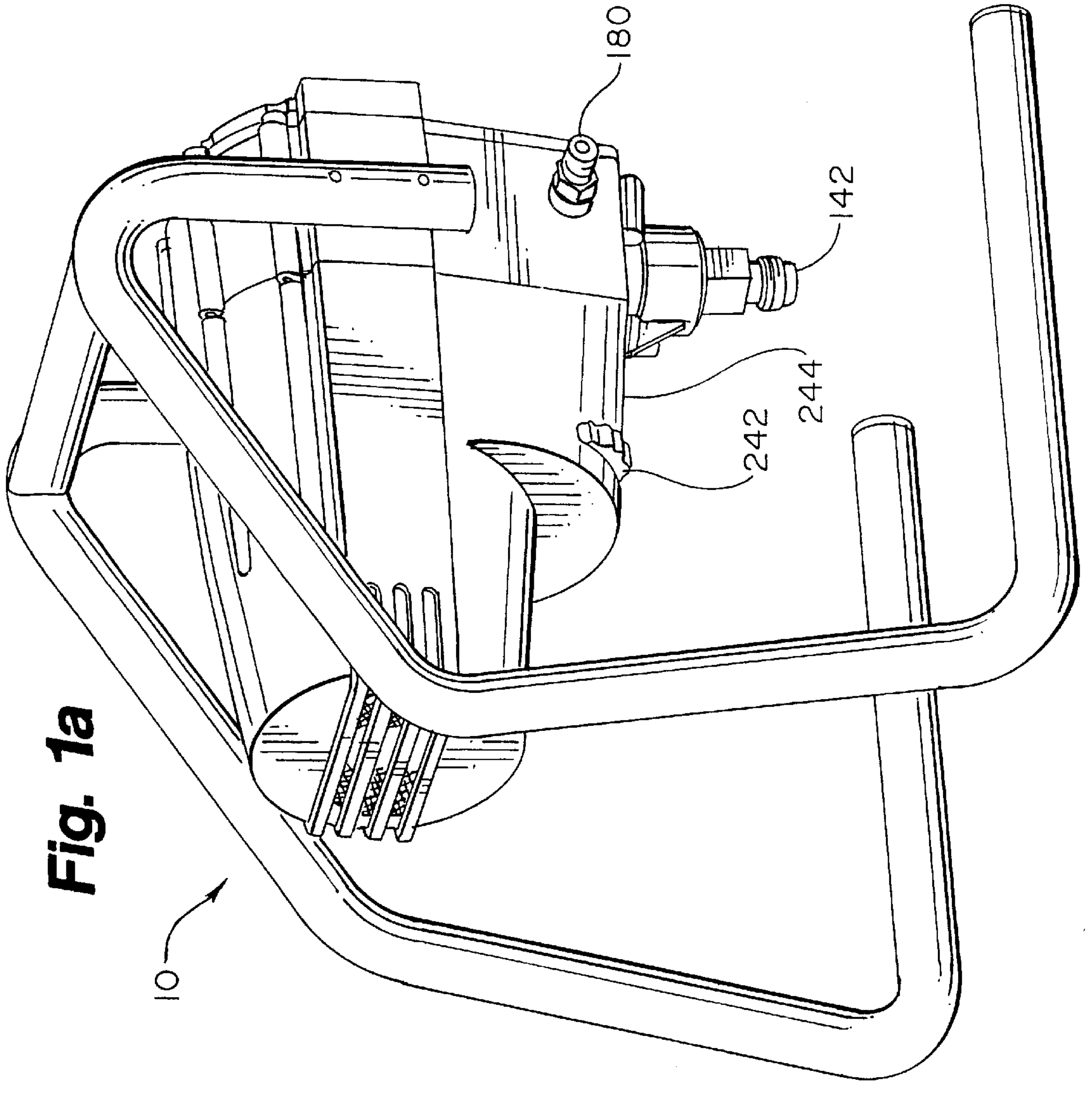
FIG. 1*a* is a perspective right side view of the piston pump of the present invention.

A pressure switch knob 242 is fixedly coupled to the spindle body 230. In an embodiment, a portion of knob 242 projects through an aperture defined in the pump shroud 244, as depicted in FIG. 1*a,* to facilitate manual actuation thereof.

In operation, an operator of the piston pump 10 connects a suction hose to the inlet fitting 142. A return line is coupled to the return fitting 164. Typically, the suction line and the return line are routed together such that the open ends of the suction line and the return line are immersed in the fluid in a fluid container. A high pressure hose is connected to the spray hose fitting 180. A fluid dispenser is typically coupled to a second end of the high pressure hose. As previously indicated there are a number of different types of fluid dispensers. Each of such dispensers offers a certain amount of resistance to the flow of fluid from the spray hose fitting 180 to through the high pressure hose and out the dispenser.

The motor 18 is then activated by on/off switch 246 (FIG. 1) and, by means of the pump drive assembly 12, the pump assembly 14 commences reciprocal (up/down) motion at a preferred rate of about 260 cycles per minute. The operator selects the prime position on the prime assembly 86 by rotation of the knob 174 (FIG. 1*a*). Rotation of the knob 174 to the prime position causes the knob 174 to ride up on the cam 172. This motion causes the ball/stem assembly 150 to move to the right, as depicted in FIG. 3, thereby unseating the ball 156. This opens a path of low flow resistance from the pump assembly 114 through the prime passage 98 and out the return fitting 164. The resistance to flow in this pathway is substantially less than the resistance to flow through the high pressure hose. Accordingly, substantially all of the fluid initially pumped by the pump assembly 14 is returned through the prime assembly 86 to the fluid container via the return fitting 164.

When the operator discerns that fluid is flowing through the return fitting 164 (typically the return hose is clear plastic and the fluid flow can be visually determined), the operator can be assured that the piston pump 10 is primed. The operator then turns the knob 174 to the spray position. The knob 174 backs off the cam 172, allowing the ball/stem assembly 150 to translate to the left and seating on the seat 160. The bias of the spring 166 holds the ball 156 in sealing engagement with the seat 160, thereby closing off the prime passage 98. At this point, fluid pressure begins to build in the high pressure hose.

As the pressure builds, the pressure acts on the proximal end 200 of the plunger 198 of the pressure switch assembly 16. The plunger 198 translates leftward, as depicted in FIG. 4, against the bias of spring 206. At a selected pressure, the distal end 204 of the plunger 198 contacts the paddle 226 of the micro switch 184. Further pressure on the paddle 226 causes the switch 228 to translate leftward, generating a signal that is sent to the motor 18 to turn the motor 18 off to limit fluid pressure to the desired pressure.

Activation of the fluid dispenser at the end of the high pressure hose causes the discharge of fluid and causes the fluid pressure in the piston pump 10 to drop. In a preferred embodiment, when the pressure has dropped approximately 400 pounds per square inch, the plunger 198 will have translated to the right sufficiently to release pressure on the paddle 226 and on the switch 228, thereby causing the switch 228 to translate rightward. Such translation sends a further signal to the motor 18 activating the motor 18 to again increase the fluid pressure by operating the pump assembly 14.

The fluid pressure at which the switch 228 is activated may be adjusted by rotating the pressure switch knob 242. Rotation of the pressure switch knob 242 either clockwise or counterclockwise causes the spindle body to translate within the actuator connector 221. Such rotation causes the dowel pin 234 to translate either rightward or leftward as desired, thereby rotating the micro switch 184 as indicated by the arrow A. Translation of the dowel pin 234 to the right, as depicted in FIG. 4, places the paddle 226 in closer proximity to the distal end 204 of the plunger 198. Such disposition will result in the switch 228 being actuated by the plunger 198 at a lower fluid pressure. In a preferred embodiment, rotation of the pressure switch knob 242 of the set screw assembly 186 permits selection of the shutoff pressure as desired between about 0 psi and 3000 psi and more preferably between about 400 psi and 2750 psi.

In the event of an over pressure condition, in which the plunger 198 presses hard enough on the paddle 226 to potentially crush the micro switch 184, the micro switch 184 may be rotated clockwise without moving the spindle body 230. There is a certain amount of compliance built into the set screw assembly 186 owing to the tandem arrangement of the dowel pin 234 and the spring 236. The dowel pin 234 may be translated leftward further compressing the spring 236 responsive to excessive pressure exerted by the plunger 198. If the dowel pin 234 were not capable of such translation against the spring 236, an over pressure condition would potentially cause the plunger 198 to crush the micro switch 184. After relief of the over pressure condition, the plunger 198 translates rightward and the compressed spring 236 acts on the dowel pin 234 to urge the micro switch 184 into counterclockwise rotation to its original disposition prior to the over pressure condition.

Several embodiments of the invention are described herein. These embodiments are illustrative of the invention only and should not be construed as embracing all the embodiments of the present invention or as limiting the scope of the invention.

What is claimed is:

1. A fluid pump having a motor operably coupled to a pump assembly, the motor and pump assembly acting cooperatively to pressurize a fluid, comprising:

a pressure switch arrangement, the pressure switch arrangement being in communication with the fluid under pressure and further being in communication with the motor for sensing the fluid pressure and controlling the operation of the motor to maintain a selected fluid pressure, the pressure switch arrangement having means for affording fluid over-pressure protection thereto;

a pressure sensor assembly, the pressure sensor assembly being in fluid communication with the fluid under pressure;

a micro switch being selectively couplable to the pressure sensor assembly; and a set screw assembly being operably coupled to the micro switch for selectively positioning the micro switch relative to the pressure sensor assembly, wherein the micro switch is moveable with respect to the set screw assembly, a spring bias acting on the micro switch to maintain the micro switch in engagement with the set screw assembly.

2. The fluid pump of claim 1 including a manually operable controller for setting a desired fluid pressure in the field.

3. The fluid pump of claim 2 wherein the pressure switch arrangement is selectively adjusted for controlling the fluid pressures between zero psi and 3000 psi.

4. The fluid pump of claim 2 wherein the controller includes a compliant member for accommodating a fluid over-pressure condition.

5. The fluid pump of claim 4 wherein the compliant member includes a spring bias, the spring bias acting in opposition to a force exerted by the fluid under pressure.

6. The fluid pump of claim 1 wherein the set screw assembly is translatable relative to the micro switch assembly, such translation acting on the micro switch for positioning the micro switch relative to the pressure sensor assembly.

7. The fluid pump of claim 6 wherein the micro switch is pivotable about a pivot point, the translation of the set screw assembly acting to pivot the micro switch.

8. The fluid pump of claim 7 wherein the set screw assembly includes a dowel pin, a distal end of the dowel pin being engageable with the micro switch, a proximal end of the dowel pin being in engagement with a biasing spring, the spring acting to bias the dowel pin in engagement with the micro switch.

9. The fluid pump of claim 8 wherein the pressure sensor assembly includes a plunger, the plunger having a proximal end and a distal end, the proximal end being in fluid communication with the fluid under pressure, the fluid pressure acting to generate a force on the proximal end, the distal end being engageable with the micro switch.

10. The fluid pump of claim 9 wherein a spring bias acts on the plunger in opposition to the force generated by the fluid pressure.

11. The fluid pump of claim 10 wherein a selected force generated by the fluid pressure acting on the plunger tends to overcome the spring bias and to cause translation of the plunger, such translation tending to bring the distal end of the plunger into contact with the micro switch.

12. The fluid pump of claim 11 wherein the plunger contact with the micro switch acts to generate a signal in the micro switch, the micro switch relaying the signal to a pump motor to deactivate the pump motor.

13. A method of controlling fluid pressure in a fluid pump, the fluid pressure being generated by activating a pump motor to operate a pump assembly, comprising the steps of:

selecting a desired fluid pressure by manual actuation of a set screw assembly;

positioning a micro switch relative to a pressure sensor assembly by means of such selection;

engaging the micro switch by means of a pressure sensor assembly at the selected fluid pressure;

sending a signal to the pump motor by means of the micro switch upon engagement by the pressure sensor assembly;

deactivating the pump motor responsive to the signal sent from the micro switch; and protecting the micro switch from the effects of a fluid over-pressure condition.

14. The method of claim 13 including the step of building translational compliance into the set screw assembly to effect the over-pressure protection.

15. The method of claim 14 wherein the translation compliance is effected by translating a dowel pin against the bias exerted by a spring acting on the dowel pin.

16. A method of controlling fluid pressure in a fluid pump, the fluid pressure being generated by activating a pump motor to operate a pump assembly, comprising the steps of:

selecting a desired fluid pressure by manual actuation of a set screw assembly;

positioning a micro switch relative to a pressure sensor assembly by means of such selection;

engaging the micro switch by means of a pressure sensor assembly at the selected fluid pressure, wherein the set screw assembly is selectively translatable relative to the micro switch;

sending a signal to the pump motor by means of the micro switch upon engagement by the pressure sensor assembly; and deactivating the pump motor responsive to the signal sent from the micro switch.

17. The method of claim 16 wherein translation of the set screw assembly imparts rotational motion to the micro switch.

18. A method of controlling fluid pressure in a fluid pump, the fluid pressure being generated by activating a pump motor to operate a pump assembly, comprising the steps of:

selecting a desired fluid pressure by manual actuation of a set screw assembly;

positioning a micro switch relative to a pressure sensor assembly by means of such selection and pivotally mounting the micro switch;

engaging the micro switch by means of a pressure sensor assembly at the selected fluid pressure;

sending a signal to the pump motor by means of the micro switch upon engagement by the pressure sensor assembly; and deactivating the pump motor responsive to the signal sent from the micro switch.

19. A method of controlling fluid pressure in a fluid pump, the fluid pressure being generated by activating a pump motor to operate a pump assembly, comprising the steps of:

selecting a desired fluid pressure by manual actuation of a set screw assembly;

positioning a micro switch relative to a pressure sensor assembly by means of such selection and biasing the micro switch into contact with the set screw assembly;

engaging the micro switch by means of a pressure sensor assembly at the selected fluid pressure;

sending a signal to the pump motor by means of the micro switch upon engagement by the pressure sensor assembly; and deactivating the pump motor responsive to the signal sent from the micro switch.

20. A method of controlling fluid pressure in a fluid pump, the fluid pressure being generated by activating a pump motor to operate a pump assembly, comprising the steps of:

selecting a desired fluid pressure by manual actuation of a set screw assembly, wherein the selected fluid pressure is between zero psi and 3000 psi;

positioning a micro switch relative to a pressure sensor assembly by means of such selection;

engaging the micro switch by means of a pressure sensor assembly at the selected fluid pressure;

sending a signal to the pump motor by means of the micro switch upon engagement by the pressure sensor assembly; and deactivating the pump motor responsive to the signal sent from the micro switch.

21. The method of claim 20 wherein the micro switch commands activation of the motor when the fluid pressure drops substantially 400 psi below the selected fluid pressure.

22. A pressure switch assembly for use with a fluid pump, the fluid pump having a motor operably coupled to an assembly, the motor and pump assembly acting cooperatively to pressurize a fluid, comprising:

a pressure sensor assembly being in communication with the fluid under pressure;

a micro switch being selectively in communication with the pressure sensor assembly and in communication with the motor for controlling activation of the motor; and a manually operable controller, the controller being in selective engagement with the micro switch for setting a desired fluid pressure in the field, wherein the controller includes a set screw assembly, the micro switch being moveable with respect to the set screw assembly, a spring bias acting on the micro switch to maintain the micro switch in an engagement with the set screw assembly.

23. The pressure switch of claim 22 wherein the desired fluid pressure is selectively adjustable between zero psi and 3000 psi.

24. The pressure switch of claim 23 wherein the controller includes a compliant member for accommodating a fluid over-pressure condition.

25. The pressure switch of claim 24 wherein the compliant member includes a spring bias, the spring bias acting in opposition to a force exerted by the fluid under pressure.

26. The pressure switch of claim 22 wherein the set screw assembly is translatable relative to the micro switch assembly, such translation acting on the micro switch for positioning the micro switch relative to the pressure sensor assembly.

27. The pressure switch of claim 26 wherein the micro switch is pivotable about a pivot point, the translation of the set screw assembly acting to pivot the micro switch in a first rotational direction.

28. The pressure switch of claim 27 wherein the set screw assembly includes a dowel pin, a distal end of the dowel pin being engageable with the micro switch, a proximal end of the dowel pin being in engagement with a biasing spring, the spring acting to bias the dowel pin in engagement with the micro switch.

29. The pressure switch of claim 28 wherein the pressure sensor assembly includes a plunger, the plunger having a proximal end and a distal end, the proximal end being in fluid communication with the fluid under pressure, the fluid pressure acting to generate a force on the proximal end, the distal end being engageable with the micro switch.

30. The pressure switch of claim 29 wherein a spring bias acts on the plunger in opposition to the force generated by the fluid pressure.

31. The pressure switch of claim 30 wherein a selected force generated by the fluid pressure acting on the plunger tends to overcome the spring bias and to cause translation of the plunger, such translation tending to bring the distal end of the plunger into contact with the micro switch.

32. The pressure switch of claim 31 wherein the plunger contact with the micro switch acts to generate a signal in the micro switch, the micro switch relaying the signal to a pump motor to deactivate the pump motor.

* * * * *